US005889223A

United States Patent [19]

Matsumoto

[11] Patent Number: 5,889,223

[45] Date of Patent: Mar. 30, 1999

[54] KARAOKE APPARATUS CONVERTING GENDER OF SINGING VOICE TO MATCH OCTAVE OF SONG

[75] Inventor: Shuichi Matsumoto, Hamamatsu, Japan

[73] Assignee: Yamaha Corporation, Hamamatsu, Japan

[21] Appl. No.: 46,065

[22] Filed: Mar. 23, 1998

[30] Foreign Application Priority Data

Mar. 24, 1997 [JP] Japan .................................... 9-070081

[51] Int. Cl.[6] .............................. G09B 5/00; G10H 1/06; G10H 1/26

[52] U.S. Cl. ................................ 84/609; 84/622; 84/659; 434/307 A

[58] Field of Search ..................... 84/601, 602, 609–614, 84/622–625, 659–661, 692–700, 735, 736; 434/307 A; 327/118, 119

[56] References Cited

U.S. PATENT DOCUMENTS

| | | | |
|---|---|---|---|
| 3,602,824 | 8/1971 | Rusch | 327/118 |
| 5,231,671 | 7/1993 | Gibson et al. . | |
| 5,248,845 | 9/1993 | Massie et al. | 84/622 |
| 5,296,643 | 3/1994 | Kuo et al. | 84/610 |
| 5,301,259 | 4/1994 | Gibson et al. . | |
| 5,428,708 | 6/1995 | Gibson et al. . | |
| 5,447,438 | 9/1995 | Watanabe et al. | 434/307 A |
| 5,477,003 | 12/1995 | Muraki et al. | 84/610 |
| 5,641,927 | 6/1997 | Pawate et al. | 84/609 |

OTHER PUBLICATIONS

Keith Lent, "An Efficient Method for Pitch Shifting Digitally Sampled Sounds", Departments of Music and Electrical Engineering, University of Texas at Austin, Computer Music Journal, vol. 13, No. 4, Winter 1989, pp. 65–71.

*Primary Examiner*—Stanley J. Witkowski
*Attorney, Agent, or Firm*—Pillsbury Madison & Sutro LLP

[57] ABSTRACT

In a karaoke apparatus, a tone generator responds to a request of a karaoke song for generating musical tones of the karaoke song having a given gender so as to accompany a live singing voice having an actual gender. A voice changer is provided for selectively conducting either of male-to-female conversion effective to upward shift a pitch of the live singing voice and female-to-male conversion effective to downward shift a pitch of the live singing voice. A voice analyzer is provided for analyzing the live singing voice to determine the actual gender of the live singing voice. A parameter generator is provided for comparing the determined actual gender of the live singing voice with the given gender of the karaoke song so as to control the voice changer to select either of the male-to-female conversion and the female-to-male conversion if the actual gender differs from the given gender so that the pitch of the live singing voice can be shifted to match the given gender of the karaoke song.

30 Claims, 4 Drawing Sheets

KARAOKE APPARATUS CONVERTING GENDER OF SINGING VOICE TO MATCH OCTAVE OF SONG

BACKGROUND OF THE INVENTION

1. Field of the Invention

The present invention generally relates to a karaoke apparatus for converting an input voice and outputting the converted voice.

2. Description of Related Art

Recently, a variety of karaoke apparatuses have been developed that have a voice converting capability of providing a variety of effects by performing frequency conversion or the like on an inputted voice. For example, a karaoke apparatus is known in which a pitch or a formant of an input voice is shifted to convert a male voice into a female voice and vice versa. The formant represents resonance frequency characteristics of a vocal tract of a karaoke player.

This conversion between male voice and female voice by the conventional karaoke apparatus allows the karaoke player to manually specify the gender conversion. For example, when a male singer sings a female vocal song, he manually specifies the conversion mode of male-to-female. Then, if a female singer wants to sing a female vocal song, the previous conversion mode must be cleared. These operations must be performed every time a different song is sung, thereby presenting much inconvenience to the karaoke users. In addition, the complicated operations often result in the voice conversion setting errors. For example, although the input is a male voice, if the female-to-male conversion is specified, the input of the low voice is shifted to a further low voice, thereby sometimes offending the ear of audiences. Moreover, in the conventional voice conversion, the pitch shift and the formant shift are performed on an input voice regardless of its quality or property. therefore, depending on the voice quality, the converted voice often sounds unnatural.

SUMMARY OF THE INVENTION

It is therefore an object of the present invention to provide a karaoke apparatus capable of automatically switching gender modes of the voice conversion based on the type of a song to be sung by a karaoke player and based on the gender of the karaoke player when performing the voice conversion.

It is another object of the present invention to provide a karaoke apparatus capable of performing appropriate voice conversion by taking the quality of an input voice into consideration.

According to the invention, a karaoke apparatus comprises tone generating means responsive to a request of a karaoke song for generating musical tones of the karaoke song having a given gender so as to accompany a live singing voice having an actual gender, voice converting means for selectively conducting either of male-to-female conversion effective to upward shift a pitch of the live singing voice and female-to-male conversion effective to downward shift a pitch of the live singing voice, voice analyzing means for analyzing the live singing voice to determine the actual gender of the live singing voice, and controlling means for comparing the determined actual gender of the live singing voice with the given gender of the karaoke song so as to control the voice converting means to select either of the male-to-female conversion and the female-to-male conversion if the actual gender differs from the given gender so that the pitch of the live singing voice can be shifted to match the given gender of the karaoke song.

Specifically, the karaoke apparatus further comprises providing means for providing music data which represents the karaoke song and which is processed by the tone generating means to generate the musical tones of the karaoke song, and identifying means for identifying the given gender of the karaoke song according to identification information of the given gender contained in the provided music data so that the controlling means compares the actual gender of the live singing voice determined by the voice analyzing means with the given gender of the karaoke song identified by the identifying means. Alternatively, the karaoke apparatus further comprises providing means for providing music data which represents the musical tones of the karaoke song and which is processed by the tone generating means to generate the musical tones of the karaoke song, and detecting means for detecting the given gender of the karaoke song according to a pitch of the musical tones based on the provided music data so that the controlling means compares the actual gender of the live singing voice determined by the voice analyzing means with the given gender of the karaoke song detected by the detecting means.

Preferably, the voice converting means further comprises formant converting means for modifying a formant which represents a frequency spectrum of the live singing voice during the male-to-female conversion and the female-to-male conversion so that the live singing voice can be compensated for distortion due to the shift of the pitch of the live singing voice. In such a case, the formant converting means operates during the male-to-female conversion for broadening an interval between a first peak and a second peak of the formant, and operates during the female-to-male conversion for narrowing an interval between a first peak and a second peak of the formant.

Preferably, the voice analyzing means comprises pitch analyzing means for analyzing the pitch of the live singing voice to determine the actual gender of the live singing voice by comparing the analyzed pitch with a predetermined threshold pitch. Further, the voice analyzing means comprises formant analyzing means for analyzing a formant which represents a frequency spectrum of the live singing voice to determine the actual gender of the live singing voice according to an interval between a first peak and a second peak contained in the analyzed formant. Moreover, the voice analyzing means comprises noise analyzing means for analyzing a noise which may be distributed in the live singing voice to determine the actual gender of the live singing voice according to distribution of the analyzed noise.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings. It should be noted that the present invention will be described as preferably embodied in a communication-type karaoke apparatus. Obviously, however, the invention is also applicable to karaoke apparatuses of other types.

Figure 1:
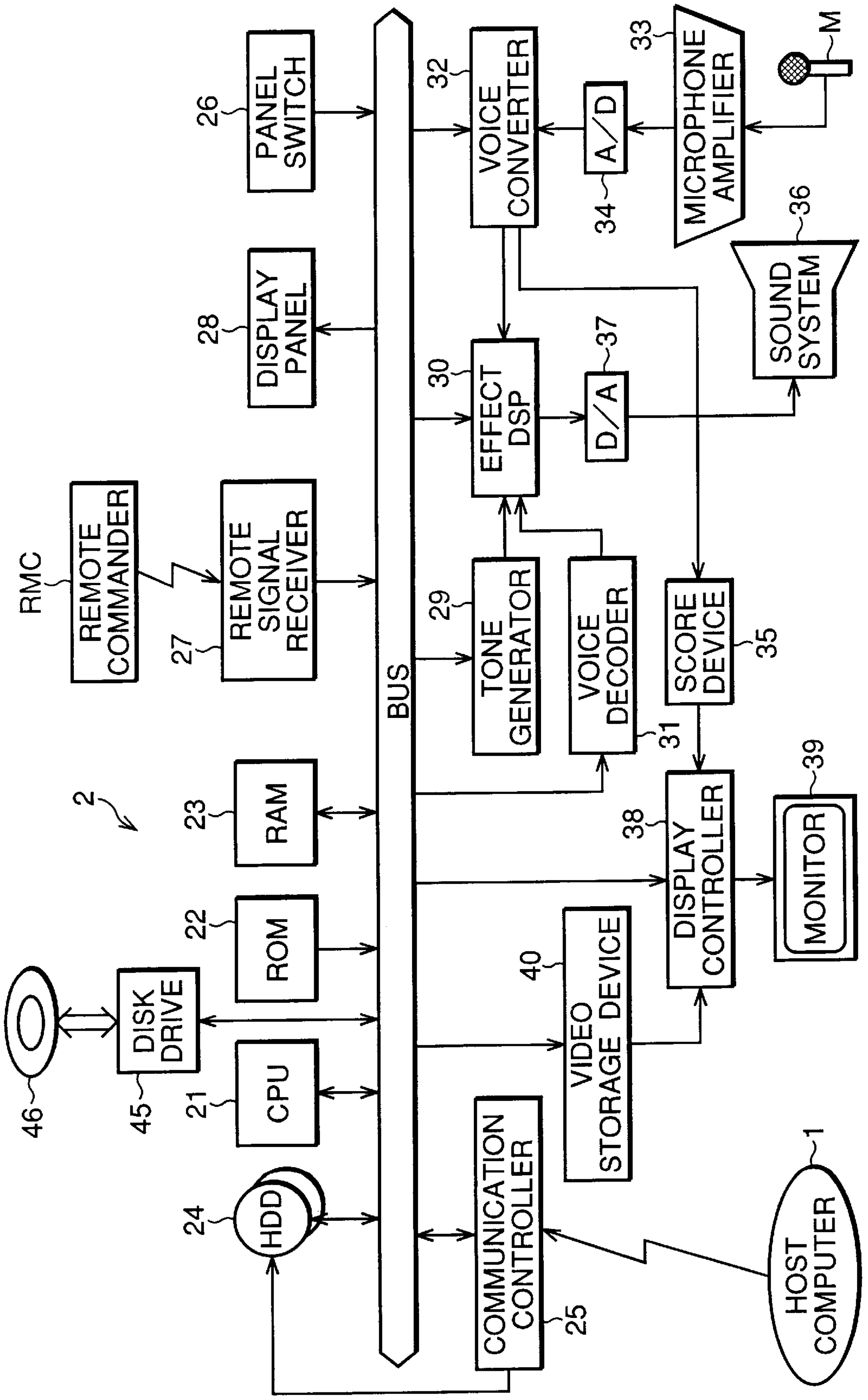
FIG. 1 is a block diagram illustrating overall constitution of a karaoke apparatus practiced as a first preferred embodiment of the invention.
Figure 2:
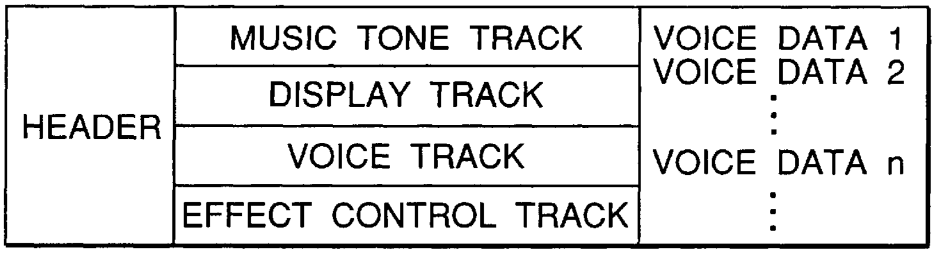
FIG. 2 is diagram illustrating a data format indicative of contents of music data treated in the first preferred embodiment.

Now, referring to FIG. 1, there is shown a block diagram illustrating overall constitution of a karaoke apparatus practiced as a first preferred embodiment of the invention. In the figure, a host computer 1 installed in a center station has a database that stores karaoke music data. The host computer 1 is connected through a communication line such as a telephone line or an ISDN (Integrated Services Digital Network) to a plurality of karaoke terminals 2 installed in karaoke entertainment shops. From the center station, music data is periodically distributed to the karaoke terminals 2.

The following describes components of each karaoke terminal 2 or karaoke apparatus. A CPU (Central Processing Unit) 21 controls the components of the karaoke apparatus connected to the CPU 21 through a bus. A ROM (Read Only Memory) 22 stores a control program to be executed by the CPU 21 and font data used for displaying lyric words included in the music data. A RAM (Random Access Memory) 23 serves as a work area of the CPU 21. A hard disk drive (HDD) 24 stores the music data distributed from the host computer 1. Namely, in the karaoke terminal 2, the music data supplied from the host computer 1 is stored in the hard disk drive 24 before being read for processing by the karaoke apparatus. A communication controller 25 receives the music data sent from the host computer 1 to transfer the received music data to the hard disk drive 24. The communication controller 25 is a modem if the communication line is the telephone line or a terminal adapter if the communication line is the ISDN. A disk drive 45 is provided to receive a machine readable medium 46 such as a floppy disk which stores music data and programs.

The following describes contents of the music data. The music data of one karaoke song is composed of a header, music tone track, a display track, a voice track, an effect control track, and a voice data area. The header records various index data associated with the karaoke song such as a song title, a song code identifying the karaoke song, a singer code indicative of an original singer or an artist who originally sings the karaoke song, a genre code indicative of song attributes such as music genre, season and so on, and a play time indicative of the performance length of the karaoke song.

The music tone track records sequence data for controlling synthesis or generation of music tones. The sequence data is composed of event data for controlling note-on, note-off, and so on and duration data for controlling timing of note-on and note-off events. The display track records code information for displaying lyric words of the karaoke song in synchronization with progression of the karaoke song. The voice track records address information for reading ADPCM (Adaptive Differential Phase Code Modulation) data representative of a background vocal or else from the voice data area in synchronization with the karaoke song progression. The effect control track records control data for controlling effects such as echo and reverberation to be imparted to the music tones of the karaoke song.

Referring to FIG. 1 again, a panel switch 26 is arranged on an operator panel (not shown) of the karaoke apparatus. The panel switch 26 is operated to specify start or stop of karaoke play and to set volume, tempo, key control, pitch shift for voice conversion, and voice quality. The panel switch 26 sends the operational inputs and settings to the CPU 21. A remote signal receiver 27 receives a signal indicative of a song code and start and stop of the karaoke play from a remote commander RMC, and sends the received signal to the CPU 21 as input commands. A display panel 28 constituted by an LCD (Liquid Crystal Display) for example displays a request song code and messages indicative of various settings.

A tone generator 29 synthesizes a music tone signal corresponding to the tone control data included in the music data supplied from the CPU 21, and outputs the synthesized tone signal to an effect DSP (Digital Signal Processor) 30. A voice decoder 31 generates a voice signal corresponding to the ADPCM data representative of the background vocal included in the music data supplied by the CPU 21, and outputs the generated voice signal to the effect DSP 30. A voice converter 32 performs predetermined voice conversion processing on a live singing voice which is inputted from a microphone M, then amplified by a microphone amplifier 33, and converted into a digital signal by an A/D converter 34. The resultant singing voice signal is supplied from the voice converter 32 to the effect DSP 30 and to a score device 35. The effect DSP 30 operates based on the effect control data included in the music data supplied from the CPU 21 for imparting various effects such as echo and reverberation to the synthetic tone signal supplied from the tone generator 29, the mechanical voice signal such as the background vocal supplied from the voice decoder 31, and the live singing voice signal processed by the voice converter 32. The digital signal imparted with the effect is converted by a D/A converter 37 into an analog signal, which is supplied to a sound system 36 to be sounded from a loudspeaker. On the other hand, the score device 35 evaluates the vocal skill of the singer based on the result of analyzing the microphone inputs in the voice converter 32, and outputs an obtained score as numerical marks.

A display controller 38 controls display operation of a monitor 39. During karaoke performance, the display controller 38 superimposes lyric words presented by the font data read from the ROM 22 onto video data for displaying karaoke background video supplied from a video storage device 40 such as a moving picture CD, and displays a resultant synthesized image on the monitor 39. The display controller 38 also displays the score outputted from the score device 35 on the monitor 39 when one session of karaoke performance ends.

Figure 3:
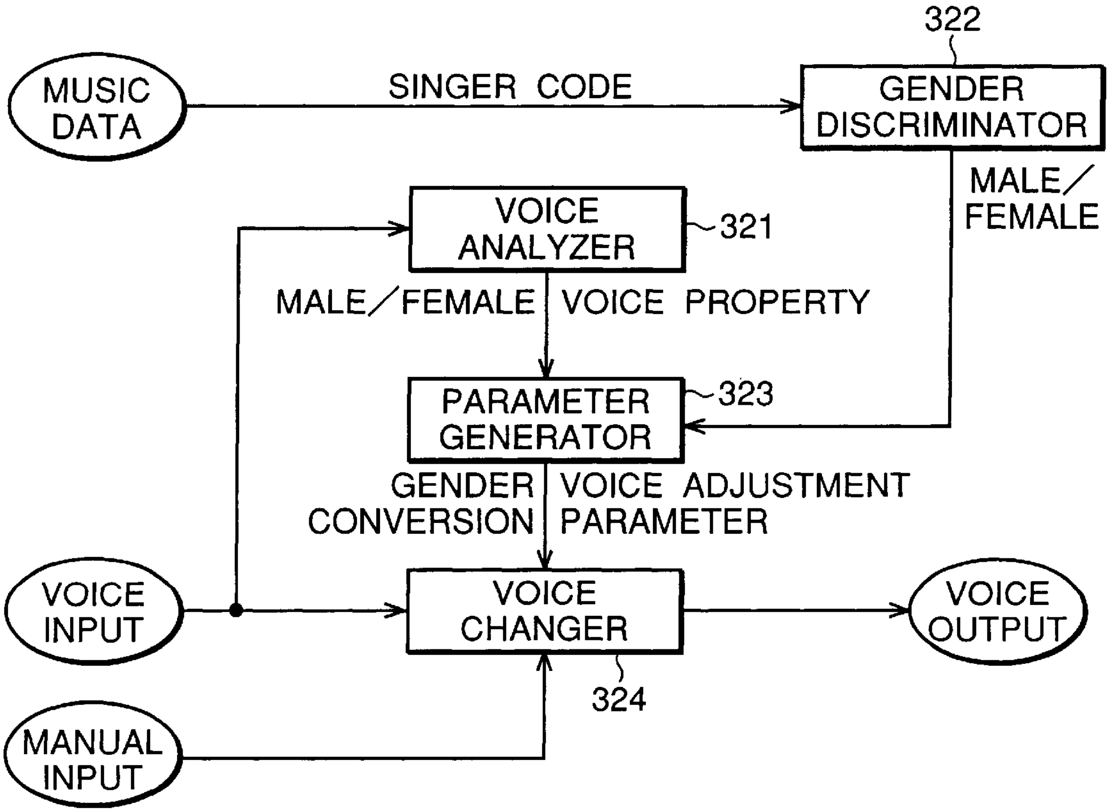
FIG. 3 is a block diagram illustrating constitution of a voice converter provided in the first preferred embodiment.
Figure 6A:
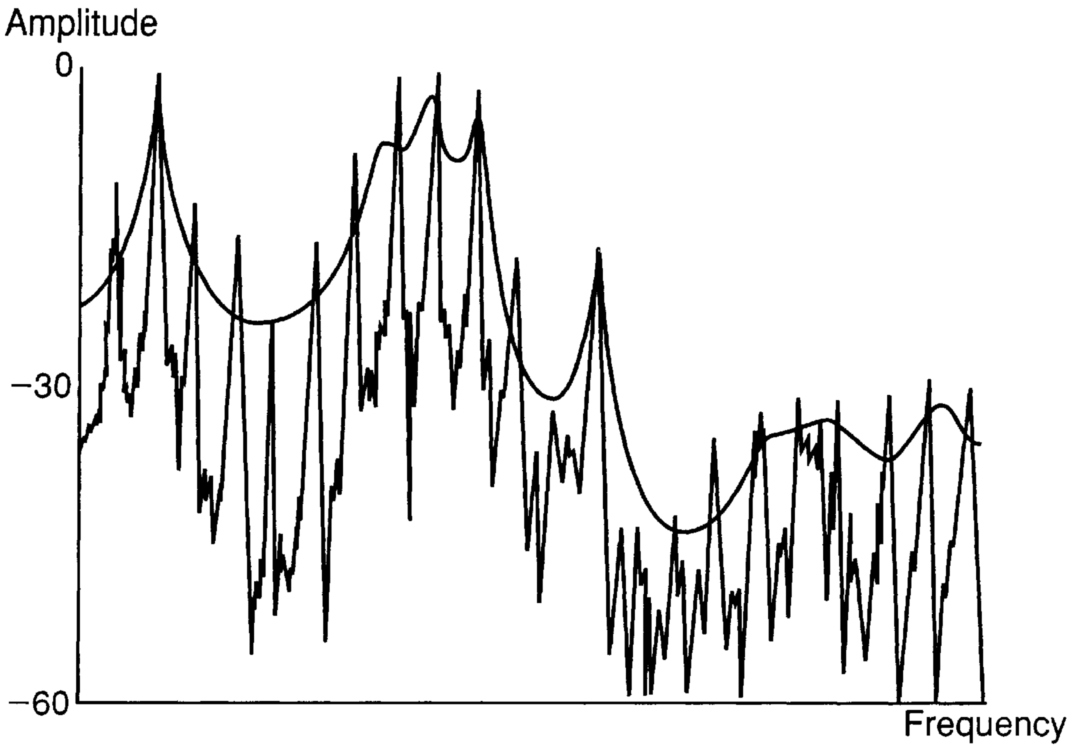
FIGS. 6A and 6B show frequency spectra of soprano and baritone voices.
Figure 6B:
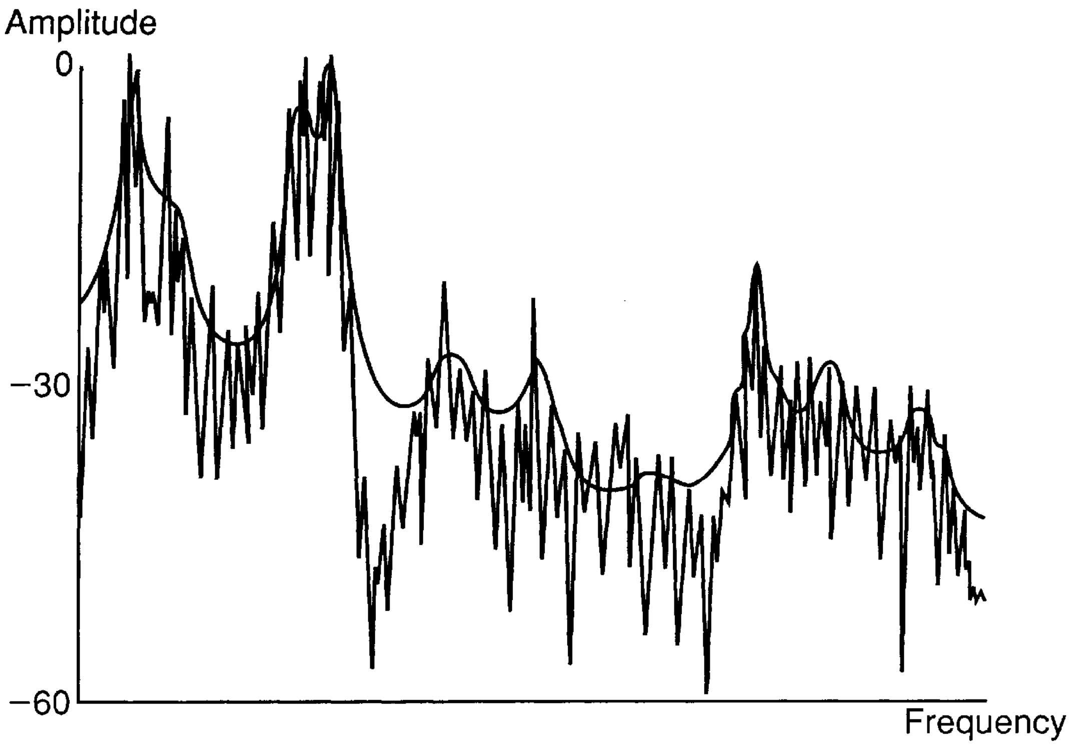

The following describes detailed constitution of the voice converter 32. FIG. 3 is a block diagram illustrating the detailed constitution of the voice converter 32. The voice converter 32 has a voice analyzer 321 for analyzing a live singing voice supplied from the microphone M. This voice analyzer 321 extracts a pitch of the live singing voice, and analyzes the formant thereof to determine the gender of the singer and to extract a voice property of the karaoke singer. If the pitch of the live singing voice is equal to or higher than a first threshold PH, the voice analyzer 321 determines that the singer is female. If the pitch is lower than a second threshold PL (where $PL<PH$), the voice analyzer 321 determines that the singer is male. If the pitch falls in an intermediate range between these threshold values PH and PL, the gender cannot be determined by the pitch alone. In such a case, the formant of the live singing voice is used for the determination. For example, since a female voice tends to have a wider interval between first and second peaks of the formant as compared to a male voice, the gender is determined by that interval. A low-tone female voice is characterized by less noise component in treble, so that the gender may be determined based on distribution of the noise component in treble. For example, FIG. 6A shows a frequency spectrum of a typical soprano voice, and FIG. 6B shows a frequency spectrum of a typical baritone voice, where a common phrase is sung by these voices. Generally, the voice property denotes a parameter indicative of an envelope feature along the frequency axis of the live singing voice. To be more specific, the voice property includes positions and levels of the first and second formant peaks along the frequency axis. Especially, the position and level of the second formant peak significantly influences the characteristics of the live singing voice, thereby providing an important voice property. The voice analyzer 321 also extracts the volume of the live singing voice, and outputs the extracted volume together with the above-mentioned pitch extraction result to the score device 35. Based on the volume and the pitch of the live singing voice relative to a main melody specified by the music data, the score device 35 scores the vocal skill of the karaoke singer.

A gender discriminator 322 determines the gender of a professional singer or artist originally entitled to the karaoke song. The gender discriminator 322 holds identification information in the form of a gender decision table indicative of the relationship between the singer code and the gender, and references the gender decision table by use of the singer code read from the header of the music data as key to determine the gender of the karaoke song.

A parameter generator 323 generates control parameters for the voice conversion. First, the parameter generator 323 compares the decision result by the voice analyzer 321 and the other decision result by the gender discriminator 322. Based on this comparison, the parameter generator 323 generates the control parameters for specifying the gender conversion mode. To be more specific, if the gender decision by the voice analyzer 321 is male and the gender decision by the gender discriminator 322 is female, the parameter generator 323 specifies the male-to-female conversion mode. Otherwise, the parameter generator 323 specifies the female-to-male conversion mode. If the gender decision by the voice analyzer 321 matches that by the gender discriminator 322, there is no need for gender conversion and therefore the parameter generator 323 specifies the non-conversion mode.

The parameter generator 323 also generates a voice adjustment parameter based on the voice property extracted by the voice analyzer 321 in order to perform appropriate voice conversion according to the voice quality of the karaoke singer. Without regard to the quality of the live singing voice, so-called octave shift for executing simple conversion between male and female voices may result in an unnaturally sounding voice such as a so-called robot voice. To circumvent this problem, the parameter generator 323 stores the voice properties of standard or typical male and female voices. Before executing the voice conversion, the parameter generator 323 generates the voice adjustment parameter to adjust the voice property extracted from the live singing voice to the stored voice properties.

Figure 4:
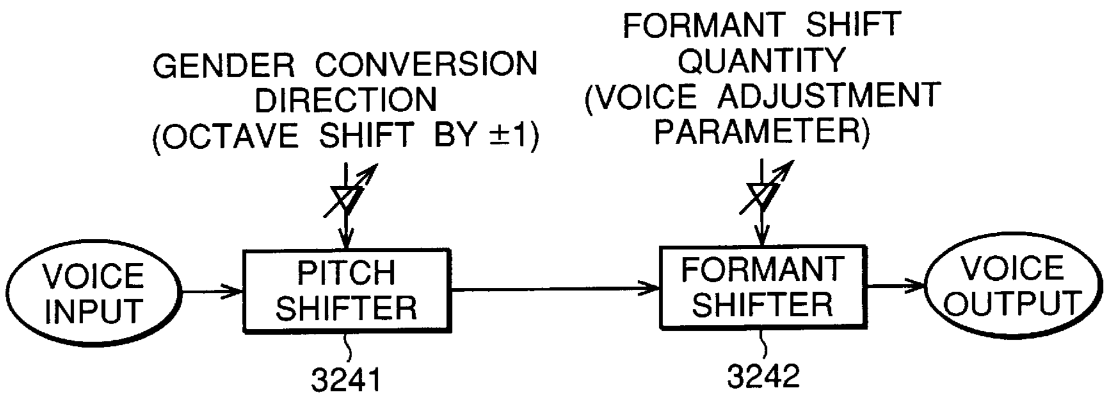
FIG. 4 is a block diagram illustrating constitution of a voice changer provided in the above-mentioned voice converter.

A voice changer 324 performs the conversion processing on the live singing voice based on the parameters supplied from the parameter generator 323. The voice changer 324 is composed of a pitch shifter 3241 and a formant shifter 3242 as shown in FIG. 4. The pitch shifter 3241 shifts the pitch of the live singing voice by a pitch conversion method known as Rent method, for example. In the Rent method, for treating a repetitive unit waveform contained in the live singing voice signal, the unit waveform is captured by a window known as Hanning function having a period corresponding to the repetitive unit waveform. The Hanning function is described in a paper "An Efficient Method for Pitch Shifting Digitally Sampled Sounds" Keith Lent, Departments of Music and Electrical Engineering, University of Texas at Austin, Tex. 78712 USA, Computer Music Journal, Vol. 13, No. 4, Winter 1989. The whole description of this paper is herein incorporated into this specification by the reference thereto. The captured repetitive unit waveform is further re-synthesized by a period other than the period of the capturing. Namely, in the Rent method, the period of re-synthesis is expanded or compressed for pitch conversion while the formant of the live singing voice can be retained to a certain degree. For example, in the male-to-female conversion, compressing the re-synthesis period to a half of the capture period doubles the pitch, thereby raising the music interval by one octave. In the female-to-male conversion, expanding the re-synthesis period two times as large as the capture period halves the pitch, thereby lowering the music interval or key by one octave.

The formant shifter 3242 reads a frequency component corresponding to the formant of the live singing voice by means of a read sampling clock different from an input sampling clock so as to shift the formant. The shifting quantities by the pitch shifter 3241 and the formant shifter 3242 are controlled by the parameters supplied from the parameter generator 323. It should be noted that the voice changer 324 can also perform the voice conversion according to a manual input made from the panel switch 26. In this case, quantities or degrees of the pitch shift and the formant shift are specified manually.

As described above, in the first embodiment of the inventive karaoke apparatus, tone generating means is provided in the form of the tone generator 29 which is responsive to a request of a karaoke song for generating musical tones of the karaoke song having a given gender so as to accompany a live singing voice having an actual gender. Voice converting means is provided in the form of the voice changer 324 contained in the voice converter 32 for selectively conducting either of male-to-female conversion effective to upward shift a pitch of the live singing voice and female-to-male conversion effective to downward shift a pitch of the live singing voice. Voice analyzing means is provided in the form of the voice analyzer 321 for analyzing the live singing voice to determine the actual gender of the live singing voice. Controlling means is provided in the form of the parameter generator 323 for comparing the determined actual gender of the live singing voice with the given gender of the karaoke song so as to control the voice converting means to select either of the male-to-female conversion and the female-to-male conversion if the actual gender differs from the given gender so that the pitch of the live singing voice can be shifted to match the given gender of the karaoke song.

The inventive karaoke apparatus further includes providing means in the form of the HDD 24 or the communication controller 25 for providing music data which represents the karaoke song and which is processed by the tone generating means to generate the musical tones of the karaoke song, and identifying means in the form of the gender discriminator 322 for identifying the given gender of the karaoke song according to identification information of the given gender contained in the provided music data so that the controlling means compares the actual gender of the live singing voice determined by the voice analyzing means with the given gender of the karaoke song identified by the identifying means.

Preferably, the voice converting means further comprises formant converting means in the form of the formant shifter 3242 for modifying a formant which represents a frequency spectrum of the live singing voice during the male-to-female conversion and the female-to-male conversion so that the live singing voice can be compensated for distortion due to the shift of the pitch of the live singing voice. In such a case, the formant converting means operates during the male-to-female conversion for broadening an interval between a first peak and a second peak of the formant, and operates during the female-to-male conversion for narrowing an interval between a first peak and a second peak of the formant.

Preferably, the voice analyzing means comprises pitch analyzing means for analyzing the pitch of the live singing voice to determine the actual gender of the live singing voice by comparing the analyzed pitch with a predetermined threshold pitch. The voice analyzing means further comprises formant analyzing means for analyzing a formant which represents a frequency spectrum of the live singing voice to determine the actual gender of the live singing voice according to an interval between a first peak and a second peak contained in the analyzed formant. The voice analyzing means further comprises noise analyzing means for analyzing a noise which may be distributed in the live singing voice to determine the actual gender of the live singing voice according to distribution of the analyzed noise.

In a preferred form of the inventive karaoke apparatus, the voice analyzing means comprises pitch analyzing means for analyzing the pitch of the live singing voice to determine the actual gender of the live singing voice, and volume analyzing means for analyzing a volume of the live singing voice. Scoring means is provided in the form of the score device 35 for scoring the live singing voice according to the analyzed pitch and the analyzed volume of the live singing voice.

The following describes the operation of the above-mentioned first preferred embodiment having the above-mentioned constitution. First, the overall operation of the karaoke apparatus practiced as the above-mentioned preferred embodiment will be described. It is assumed that the music data has already been distributed from the host computer 1 to the karaoke terminal 2 and stored in the hard disk drive 24. First, the karaoke terminal 2 is powered on. When a song code of a desired karaoke song is inputted from the remote commander RMC upon request, an optical signal indicative of this song code is radiated from the remote commander RMC. The optical signal is received by the remote signal receiver 27. The CPU 21 recognizes the specified song code from the received optical signal, and reads the music data of the karaoke song corresponding to the song code from the hard disk drive 24, thereby starting reproduction of the karaoke song.

Next, music tone control information included in event data read from the music tone track of the music data is supplied to the tone generator 29 at a timing specified by the duration data of the music tone control information, thereby starting karaoke performance. On the other hand, a background video corresponding to a genre code specified in the header of the music data is reproduced by the video storage device 40. At this moment, the background video matching the music genre and season of the karaoke song is selected. The reproduced background video is superimposed with the lyric words represented by the font codes read from the display track of the music data, and the result of the superimposed image is displayed on the monitor 39.

The live singing voice uttered by the karaoke singer inputted through the microphone M, the karaoke music tones outputted from the tone generator 29, and the background vocal tones outputted from the voice decoder 31 are imparted with various effects such as echo and reverberation by the effect DSP 30. The resulting sound is sounded from the loudspeaker.

The following describes the operation to be performed when the user specifies the automatic voice conversion mode by the panel switch 26 in the above-mentioned karaoke performance. In what follows, an example in which a female vocal song is sung by a male karaoke singer is used. Namely, the male karaoke singer sings a karaoke song originally entitled to a female singer. In this case, the singer code specified in the header of the music data is read as the gender identification information by the gender discriminator 322, which determines that the karaoke song is originally entitled to a female vocal by referencing the gender decision table. This decision is supplied to the parameter generator 323.

On the other hand, the live singing voice uttered by the male karaoke singer is analyzed by the voice analyzer 321, and the pitch or interval of the live singing voice is compared with the first and second thresholds PH and PL. If the live singing voice is a bass typical to the male voice, the interval is lower than the second threshold PL, thereby determining that the live singing voice is of a male. If the interval of the live singing voice is high for a male and lower than the first threshold PH but higher than the second threshold PL, the gender cannot be determined by the music interval alone. In such a case, formant analysis is also used. To be more specific, because the interval between the first and second formant peaks is narrower in male voice than female voice, it is determined that the live singing voice is of male if the interval is found smaller than a predetermined threshold. If the decision cannot be obtained by the formant peak interval, the quantity of noise component in treble is checked. If a relatively large quantity of the noise component is found, the live singing voice is determined to be of male. The decision result thus obtained is supplied to the parameter generator 323 along with the voice property obtained by the formant analysis.

In the parameter generator 323, the gender decision by the gender discriminator 322 and the other gender decision by the voice analyzer 321 are compared with each other. From the comparison, it is recognized that the female vocal song is being sung by the male karaoke singer. This information commences the male-to-female conversion mode in the voice changer 324. Also, in order to perform the voice conversion according to the voice quality of the karaoke singer, the parameter generator 323 generates the voice adjustment parameter for adjusting the formant of the converted voice based on the voice property supplied from the voice analyzer 321. The generated voice adjustment parameter is supplied to the voice changer 324. In order to convert the pitch from the male voice to the female voice, the voice changer 324 causes the pitch shifter 3241 to shift the pitch of the live singing voice to the treble side by one octave, and then causes the formant shifter 3242 to shift the formant position according to the voice adjustment parameter supplied from the parameter generator 323.

In the male-to-female conversion, the voice adjustment is performed as follows. Generally, the interval between the first and second formant peaks is wider in female voice than male voice. Therefore, the male-to-female conversion requires to shift the second formant to the treble side, thereby widening the formant interval. At this moment, when converting a male voice originally having a relatively wide interval between the first and second formant peaks in the live singing voice, the second formant is shifted to the treble side in a relatively small degree. On the other hand, when converting another male voice originally having a relatively narrow interval between the first and second formant peaks in the live singing voice, the second formant is shifted to the treble side in a relatively large degree.

If a male karaoke singer is replaced by a female karaoke singer during the above-mentioned karaoke performance, the decision by the gender discriminator 322 matches the other decision by the voice analyzer 321, so that the parameter generator 323 instructs the voice changer 324 to stop the gender converting operation. This causes the voice changer 324 to perform nothing on the live singing voice and therefore to output the same as it is.

On the other hand, when a male vocal song is sung by a female karaoke singer, the female-to-male voice conversion is performed. In this case, the interval of the live singing voice is octave-shifted to the treble side. For the voice quality adjustment, the second formant is shifted to the bass side in this case from the viewpoint opposite to the above-mentioned male-to-female voice conversion.

As described above, the inventive karaoke method is commenced in response to a request of a karaoke song for generating musical tones of the karaoke song having a given gender so as to accompany a live singing voice having an actual gender. The inventive karaoke method is performed by the steps of providing capability of male-to-female conversion effective to upward shift a pitch of the live singing voice and female-to-male conversion effective to downward shift a pitch of the live singing voice, analyzing the live singing voice to determine the actual gender of the live singing voice, and comparing the determined actual gender of the live singing voice with the given gender of the karaoke song so as to select either of the male-to-female conversion and the female-to-male conversion if the actual gender differs from the given gender so that the pitch of the live singing voice can be shifted to match the given gender of the karaoke song.

The inventive karaoke method further comprises the steps of providing music data which represents the karaoke song and which is processed to generate the musical tones of the karaoke song, and identifying the given gender of the karaoke song according to identification information of the given gender contained in the provided music data so that the comparing step compares the determined actual gender of the live singing voice with the identified given gender of the karaoke song.

Preferably, the inventive karaoke method further comprises the step of modifying a formant which represents a frequency spectrum of the live singing voice during the male-to-female conversion and the female-to-male conversion so that the live singing voice can be compensated for distortion due to the shift of the pitch of the live singing voice.

In such a case, the step of modifying is carried out during the male-to-female conversion to broaden an interval between a first peak and a second peak of the formant, and is otherwise carried out during the female-to-male conversion to narrow an interval between a first peak and a second peak of the formant.

Preferably, the step of analyzing comprises analyzing the pitch of the live singing voice to determine the actual gender of the live singing voice by comparing the analyzed pitch with a predetermined threshold pitch. In such a case, the step of analyzing further comprises analyzing a formant which represents a frequency spectrum of the live singing voice to determine the actual gender of the live singing voice according to an interval between a first peak and a second peak contained in the analyzed formant. Moreover, the step of analyzing further comprises analyzing a noise which may be distributed in the live singing voice to determine the actual gender of the live singing voice according to distribution of the analyzed noise.

Figure 5:
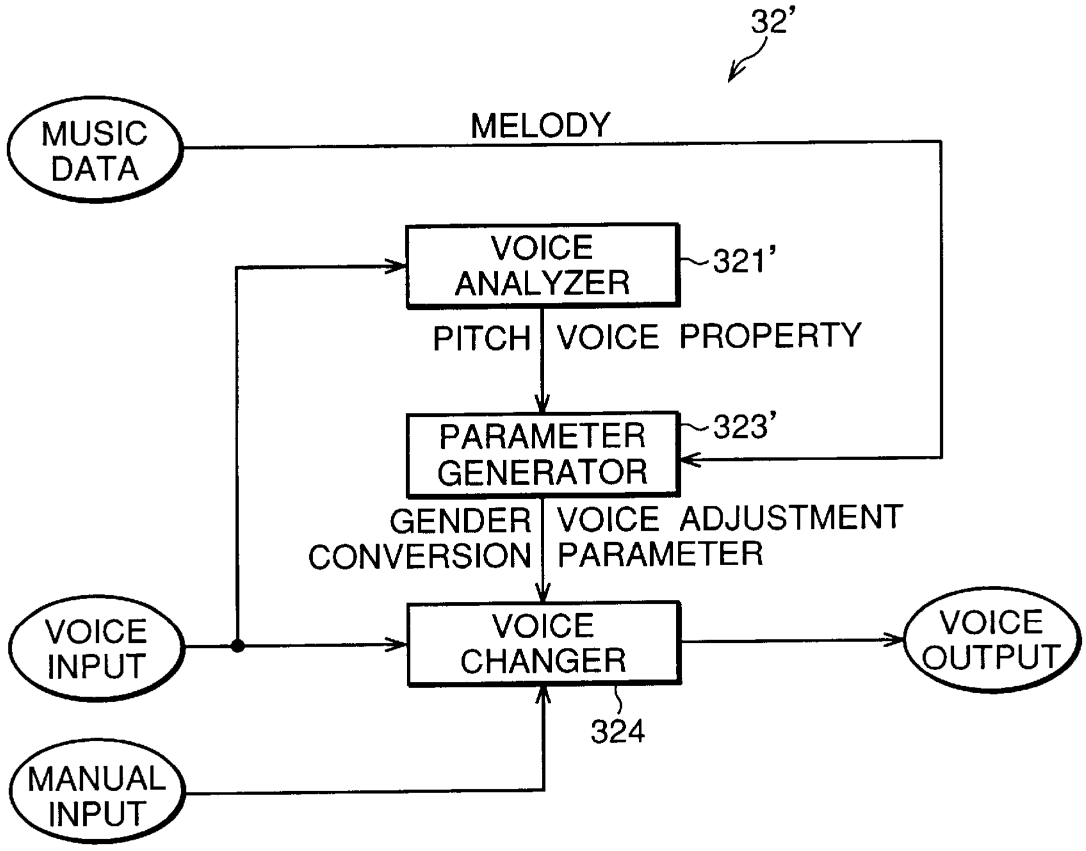
FIG. 5 is a block diagram illustrating constitution of a voice converter provided in a karaoke apparatus practiced as a second preferred embodiment of the invention.

The following describes a second preferred embodiment of the invention. FIG. 5 is a block diagram illustrating a voice converter 32' practiced in this second preferred embodiment. The voice converter 32 of the first embodiment shown in FIG. 3 determines the voice conversion direction from male to female or vice versa based on the gender determination according to the identification information of the karaoke song. The voice converter 32' of the second preferred embodiment determines the voice conversion direction according to comparison between a prescribed melody of the karaoke song and an actual melody of the live singing voice. Therefore, the voice converter 32' does not have the gender discriminator 322. A voice analyzer 321' does not perform gender determination, either.

In the second preferred embodiment, the voice analyzer 321' outputs the melody information of the live singing voice obtained by the pitch detection instead of the gender determination to a parameter generator 323'. The actual melody information of the live singing voice and the prescribed melody information of the karaoke song are inputted in the parameter generator 323'. Consequently, the parameter generator 323' compares pitches between the prescribed melody or key of the karaoke song and the actual melody or key of the live singing voice to determine the gender conversion direction by the following criteria for example. To be more specific, the pitch or interval offset between the live singing voice and the karaoke song melody is within a half octave, the parameter generator 323' does not instruct the voice changer 324 for the voice conversion. If the pitch or interval of the live singing voice is higher than that of the melody of the karaoke song by a half octave or more, the parameter generator 323' instructs the voice changer 324 to perform the female-to-male voice conversion. On the other hand, if the interval of the live singing voice is lower than the melody of the karaoke song by a half octave or more, the parameter generator 323' instructs the voice changer 324 to perform the male-to-female voice conversion.

The remaining constitutions and operations are substantially the same as those of the first preferred embodiment. Namely, in the second embodiment of the inventive karaoke apparatus, tone generating means is provided in the form of the tone generator 29 which is responsive to a request of a karaoke song for generating musical tones of the karaoke song having a given melody pitch so as to accompany a live singing voice having an actual melody pitch. Voice converting means is provided in the form of the voice changer 324 for selectively conducting either of male-to-female conversion effective to upward shift the actual melody pitch of the live singing voice to thereby change a gender of the live singing voice from a male to a female, and female-to-male conversion effective to downward shift the actual melody pitch of the live singing voice to thereby change a gender of the live singing voice from a female to a male. Voice analyzing means is provided in the form of the voice analyzer 321' for analyzing the live singing voice to detect the actual melody pitch of the live singing voice. Controlling means is provided in the form of the parameter generator 323' for comparing the detected actual melody pitch of the live singing voice with the given melody pitch of the karaoke song so as to control the voice converting means to select the male-to-female conversion if an octave of the detected actual melody pitch is lower than that of the given melody pitch, and otherwise to select the female-to-male conversion if an octave of the detected actual melody pitch is higher than that of the given melody pitch.

While the preferred embodiments of the present invention have been described using specific terms, such description is for illustrative purposes only, and it is to be understood that changes and variations that follow for example may be made without departing from the spirit or scope of the appended claims.

(1) In the first preferred embodiment, the gender initially given to the karaoke song is determined based on the relationship between a singer code of the karaoke song and the gender of the original singer identified by the singer code. It will be apparent that the given gender may also be determined based on the relationship between the song code and the gender allotted to the karaoke song. Alternatively, by constituting the song code not as information independent of the singer code, but by assigning a part of multi-bit data indicative of the song code to the singer code, gender may be determined based on the relationship between this singer code and gender. Alternatively still, a gender code may be included in a header of the music data as the identification information for direct specification of gender.

(2) A duet karaoke song for example has a male vocal part and a female vocal part; a part to be sung only by male, a part to be sung only by female, and a part to be sung by both. In this case, because gender change takes place halfway through the song, the gender determination based on the singer code as with the first preferred embodiment cannot be used for the voice conversion. To overcome this problem, a gender code may be included in the music data every time the vocal gender change takes place, based on which the gender of each of the above-mentioned parts is determined by the gender discriminator 322. In the second preferred embodiment, the mode of voice conversion between male and female is determined based on the offset in the pitch or interval between the karaoke melody and the singing voice, so that this gender determination method can be applied as it is to any duet karaoke songs.

(3) In each of the above-mentioned preferred embodiments, both the pitch shift and the formant shift are used in the voice converting means. It will be apparent that a variation based only on the pitch shift may be used for the sake of simplicity in constitution. In this case, however, the voice quality adjustment practiced in the above-mentioned preferred embodiments is not performed.

(4) The invention covers the machine readable medium 46 for use in the karaoke apparatus 2 having the CPU 21 and being responsive to a request of a karaoke song for generating musical tones of the karaoke song having a given gender so as to accompany a live singing voice having an actual gender. The machine readable medium 46 contains program instructions executable by the CPU 21 for causing the karaoke apparatus to perform the steps as described before in conjunction with the first and second embodiments of the invention.

As described and according to the invention, when performing the vocal conversion between male and female, the conversion modes can be automatically switched based on the karaoke song type and the karaoke singer's gender. Further, appropriate vocal conversion can be performed by taking the voice quality of the live singing voice into consideration.

What is claimed is:

1. A karaoke apparatus comprising:

tone generating means responsive to a request of a karaoke song for generating musical tones of the karaoke song having a given gender so as to accompany a live singing voice having an actual gender;

voice converting means for selectively conducting either of male-to-female conversion effective to upward shift a pitch of the live singing voice and female-to-male conversion effective to downward shift a pitch of the live singing voice;

voice analyzing means for analyzing the live singing voice to determine the actual gender of the live singing voice; and controlling means for comparing the determined actual gender of the live singing voice with the given gender of the karaoke song so as to control the voice converting means to select either of the male-to-female conversion and the female-to-male conversion if the actual gender differs from the given gender so that the pitch of the live singing voice can be shifted to match the given gender of the karaoke song.

2. The karaoke apparatus according to claim 1, further comprising providing means for providing music data which represents the karaoke song and which is processed by the tone generating means to generate the musical tones of the karaoke song, and identifying means for identifying the given gender of the karaoke song according to identification information of the given gender contained in the provided music data so that the controlling means compares the actual gender of the live singing voice determined by the voice analyzing means with the given gender of the karaoke song identified by the identifying means.

3. The karaoke apparatus according to claim 1, further comprising providing means for providing music data which represents the musical tones of the karaoke song and which is processed by the tone generating means to generate the musical tones of the karaoke song, and detecting means for detecting the given gender of the karaoke song according to a pitch of the musical tones based on the provided music data so that the controlling means compares the actual gender of the live singing voice determined by the voice analyzing means with the given gender of the karaoke song detected by the detecting means.

4. The karaoke apparatus according to claim 1, wherein the voice converting means further comprises formant converting means for modifying a formant which represents a frequency spectrum of the live singing voice during the male-to-female conversion and the female-to-male conversion so that the live singing voice can be compensated for distortion due to the shift of the pitch of the live singing voice.

5. The karaoke apparatus according to claim 4, wherein the formant converting means operates during the male-to-female conversion for broadening an interval between a first peak and a second peak of the formant, and operates during the female-to-male conversion for narrowing an interval between a first peak and a second peak of the formant.

6. The karaoke apparatus according to claim 1, wherein the voice analyzing means comprises pitch analyzing means for analyzing the pitch of the live singing voice to determine the actual gender of the live singing voice by comparing the analyzed pitch with a predetermined threshold pitch.

7. The karaoke apparatus according to claim 6, wherein the voice analyzing means further comprises formant analyzing means for analyzing a formant which represents a frequency spectrum of the live singing voice to determine the actual gender of the live singing voice according to an interval between a first peak and a second peak contained in the analyzed formant.

8. The karaoke apparatus according to claim 7, wherein the voice analyzing means further comprises noise analyzing means for analyzing a noise which may be distributed in the live singing voice to determine the actual gender of the live singing voice according to distribution of the analyzed noise.

9. The karaoke apparatus according to claim 1, wherein the voice analyzing means comprises pitch analyzing means for analyzing the pitch of the live singing voice to determine the actual gender of the live singing voice and volume analyzing means for analyzing a volume of the live singing voice, the karaoke apparatus further comprising scoring means for scoring the live singing voice according to the analyzed pitch and the analyzed volume of the live singing voice.

10. A karaoke apparatus comprising:

tone generating means responsive to a request of a karaoke song for generating musical tones of the karaoke song having a given melody pitch so as to accompany a live singing voice having an actual melody pitch;

voice converting means for selectively conducting either of male-to-female conversion effective to upward shift the actual melody pitch of the live singing voice to thereby change a gender of the live singing voice from a male to a female, and female-to-male conversion effective to downward shift the actual melody pitch of the live singing voice to thereby change a gender of the live singing voice from a female to a male;

voice analyzing means for analyzing the live singing voice to detect the actual melody pitch of the live singing voice; and controlling means for comparing the detected actual melody pitch of the live singing voice with the given melody pitch of the karaoke song so as to control the voice converting means to select the male-to-female conversion if an octave of the detected actual melody pitch is lower than that of the given melody pitch, and otherwise to select the female-to-male conversion if an octave of the detected actual melody pitch is higher than that of the given melody pitch.

11. A karaoke method responsive to a request of a karaoke song for generating musical tones of the karaoke song having a given gender so as to accompany a live singing voice having an actual gender, the karaoke method comprising the steps of:

providing capability of male-to-female conversion effective to upward shift a pitch of the live singing voice and female-to-male conversion effective to downward shift a pitch of the live singing voice;

analyzing the live singing voice to determine the actual gender of the live singing voice; and comparing the determined actual gender of the live singing voice with the given gender of the karaoke song so as to select either of the male-to-female conversion and the female-to-male conversion if the actual gender differs from the given gender so that the pitch of the live singing voice can be shifted to match the given gender of the karaoke song.

12. The karaoke method according to claim 11, further comprising the steps of providing music data which represents the karaoke song and which is processed to generate the musical tones of the karaoke song, and identifying the given gender of the karaoke song according to identification information of the given gender contained in the provided music data so that the comparing step compares the determined actual gender of the live singing voice with the identified given gender of the karaoke song.

13. The karaoke method according to claim 11, further comprising the steps of providing music data which represents the musical tones of the karaoke song and which is processed to generate the musical tones of the karaoke song, and detecting the given gender of the karaoke song according to a pitch of the musical tones based on the provided music data so that the comparing step compares the determined actual gender of the live singing voice with the detected given gender of the karaoke song.

14. The karaoke method according to claim 11, further comprising the step of modifying a formant which represents a frequency spectrum of the live singing voice during the male-to-female conversion and the female-to-male conversion so that the live singing voice can be compensated for distortion due to the shift of the pitch of the live singing voice.

15. The karaoke method according to claim 14, wherein the step of modifying is carried out during the male-to-female conversion to broaden an interval between a first peak and a second peak of the formant, and is otherwise carried out during the female-to-male conversion to narrow an interval between a first peak and a second peak of the formant.

16. The karaoke method according to claim 11, wherein the step of analyzing comprises analyzing the pitch of the live singing voice to determine the actual gender of the live singing voice by comparing the analyzed pitch with a predetermined threshold pitch.

17. The karaoke method according to claim 16, wherein the step of analyzing further comprises analyzing a formant which represents a frequency spectrum of the live singing voice to determine the actual gender of the live singing voice according to an interval between a first peak and a second peak contained in the analyzed formant.

18. The karaoke method according to claim 17, wherein the step of analyzing further comprises analyzing a noise which may be distributed in the live singing voice to determine the actual gender of the live singing voice according to distribution of the analyzed noise.

19. The karaoke method according to claim 11, wherein the step of analyzing comprises analyzing the pitch of the live singing voice to determine the actual gender of the live singing voice and analyzing a volume of the live singing voice, the karaoke method further comprising the step of scoring the live singing voice according to the analyzed pitch and the analyzed volume of the live singing voice.

20. A karaoke method responsive to a request of a karaoke song for generating musical tones of the karaoke song having a given melody pitch so as to accompany a live singing voice having an actual melody pitch, the karaoke method comprising the steps of:

providing capability of male-to-female conversion effective to upward shift the actual melody pitch of the live singing voice so as to thereby change a gender of the live singing voice from a male to a female;

providing capability of female-to-male conversion effective to downward shift the actual melody pitch of the live singing voice so as to change a gender of the live singing voice from a female to a male;

analyzing the live singing voice to detect the actual melody pitch of the live singing voice; and comparing the detected actual melody pitch of the live singing voice with the given melody pitch of the karaoke song so as to select the male-to-female conversion if an octave of the detected actual melody pitch is lower than that of the given melody pitch, and otherwise to select the female-to-male conversion if an octave of the detected actual melody pitch is higher than that of the given melody pitch.

21. A machine readable medium for use in a karaoke apparatus having a CPU and being responsive to a request of a karaoke song for generating musical tones of the karaoke song having a given gender so as to accompany a live singing voice having an actual gender, the medium containing program instructions executable by the CPU for causing the karaoke apparatus to perform the steps of:

providing capability of male-to-female conversion effective to upward shift a pitch of the live singing voice and female-to-male conversion effective to downward shift a pitch of the live singing voice;

analyzing the live singing voice to determine the actual gender of the live singing voice; and comparing the determined actual gender of the live singing voice with the given gender of the karaoke song so as to select either of the male-to-female conversion and the female-to-male conversion if the actual gender differs from the given gender so that the pitch of the live singing voice can be shifted to match the given gender of the karaoke song.

22. The machine readable medium according to claim 21, wherein the steps further comprise providing music data which represents the karaoke song and which is processed to generate the musical tones of the karaoke song, and identifying the given gender of the karaoke song according to identification information of the given gender contained in the provided music data so that the comparing step compares the determined actual gender of the live singing voice with the identified given gender of the karaoke song.

23. The machine readable medium according to claim 21, wherein the steps further comprise providing music data which represents the musical tones of the karaoke song and which is processed to generate the musical tones of the karaoke song, and detecting the given gender of the karaoke song according to a pitch of the musical tones based on the provided music data so that the comparing step compares the determined actual gender of the live singing voice with the detected given gender of the karaoke song.

24. The machine readable medium according to claim 21, wherein the steps further comprise modifying a formant which represents a frequency spectrum of the live singing voice during the male-to-female conversion and the female-to-male conversion so that the live singing voice can be compensated for distortion due to the shift of the pitch of the live singing voice.

25. The machine readable medium according to claim 24, wherein the step of modifying is carried out during the male-to-female conversion to broaden an interval between a first peak and a second peak of the formant, and is otherwise carried out during the female-to-male conversion to narrow an interval between a first peak and a second peak of the formant.

26. The machine readable medium according to claim 21, wherein the step of analyzing comprises analyzing the pitch of the live singing voice to determine the actual gender of the live singing voice by comparing the analyzed pitch with a predetermined threshold pitch.

27. The machine readable medium according to claim 26, wherein the step of analyzing further comprises analyzing a formant which represents a frequency spectrum of the live singing voice to determine the actual gender of the live singing voice according to an interval between a first peak and a second peak contained in the analyzed formant.

28. The machine readable medium according to claim 27, wherein the step of analyzing further comprises analyzing a noise which may be distributed in the live singing voice to determine the actual gender of the live singing voice according to distribution of the analyzed noise.

29. The machine readable medium according to claim 21, wherein the step of analyzing comprises analyzing the pitch of the live singing voice to determine the actual gender of the live singing voice and analyzing a volume of the live singing voice for scoring the live singing voice according to the analyzed pitch and the analyzed volume of the live singing voice.

30. A machine readable medium for use in a karaoke apparatus having a CPU and being responsive to a request of a karaoke song for generating musical tones of the karaoke song having a given melody pitch so as to accompany a live singing voice having an actual melody pitch, the medium containing program instructions executable by the CPU for causing the karaoke apparatus to perform the steps of:

providing capability of male-to-female conversion effective to upward shift the actual melody pitch of the live singing voice so as to thereby change a gender of the live singing voice from a male to a female;

providing capability of female-to-male conversion effective to downward shift the actual melody pitch of the live singing voice so as to change a gender of the live singing voice from a female to a male;

analyzing the live singing voice to detect the actual melody pitch of the live singing voice; and comparing the detected actual melody pitch of the live singing voice with the given melody pitch of the karaoke song so as to select the male-to-female conversion if an octave of the detected actual melody pitch is lower than that of the given melody pitch, and otherwise to select the female-to-male conversion if an octave of the detected actual melody pitch is higher than that of the given melody pitch.

* * * * *